(12) United States Patent
Taylor et al.

(10) Patent No.: US 6,277,293 B1
(45) Date of Patent: Aug. 21, 2001

(54) DUAL FILTER ISOLATION BLOCK

(76) Inventors: David S. Taylor, 8201 Leonardo Dr., Shreveport, LA (US) 71107; Robert E. McMillan, 832 Linton Rd., Benton, LA (US) 71106

(*) Notice: Subject to any disclaimer, the term of this patent is extended or adjusted under 35 U.S.C. 154(b) by 0 days.

(21) Appl. No.: 09/491,673

(22) Filed: Jan. 26, 2000

(51) Int. Cl.⁷ .................................................. B01D 37/04
(52) U.S. Cl. ............... 210/767; 137/625.29; 137/625.48; 210/341; 210/420
(58) Field of Search ..................... 210/340, 341, 210/420, 424, 767; 137/625.25, 625.29, 625.34, 625.48

(56) References Cited

U.S. PATENT DOCUMENTS

| | | | |
|---|---|---|---|
| 3,521,673 | 7/1970 | Gruner | 137/625.29 |
| 3,833,121 | * 9/1974 | Singleton et al. | 210/340 |
| 4,271,020 | 6/1981 | Van Meter | 210/133 |
| 4,469,131 | 9/1984 | Traylor . | |
| 4,501,295 | 2/1985 | Williams | 137/625.19 |
| 4,683,914 | 8/1987 | Brisland | 137/625.48 |
| 5,152,320 | 10/1992 | Zimmerly | 137/625.5 |
| 5,184,643 | 2/1993 | Raymond | 137/625.48 |

* cited by examiner

*Primary Examiner*—Joseph W. Drodge
(74) *Attorney, Agent, or Firm*—John M. Harrison (57) ABSTRACT

A dual filter isolation block for isolating a fluid stream between a fluid source and a user device and including a main body, a first fluid path provided in the main body between the source and the user device and a first filter provided in the first fluid path. A second fluid path is also provided in the main body between the source and the user device and a second filter is included in the second fluid path. A pair of spools are slidably disposed in the main body and intersect the first fluid path and the second fluid path, respectively, for selectively isolating the first fluid path and the first filter from the second fluid path and the second filter. In a specific application the dual filter isolation block selectively isolates a pair of filters for filteringg an operating fluid such as hydraulic oil or fluid between an actuator and a servo valve to protect the servo valve from contaminants in the operating fluid. The filters are each designed for separate removal and replacement while the hydraulic fluid flows through the other filter, to avoid interrupting operation of the user device. A method for maintaining a flow of operating fluid between a fluid source and a user device while continuously filtering the operating fluid is also included.

17 Claims, 8 Drawing Sheets

DUAL FILTER ISOLATION BLOCK

BACKGROUND OF THE INVENTION

1. Field of the Invention

This invention relates to the protection of control devices and mechanisms such as servo valves from contaminated operating fluid and more particularly, to a dual filter isolation block for positioning between a source of operating fluid such as hydraulic fluid or oil and the user mechanism or device receiving the operating fluid, wherein the dual filter isolation block includes a main body having a pair of fluid paths, a pair of filters provided in the fluid paths, respectively, and a pair of spools disposed for sliding operation in the main body of the isolation block and intersecting the fluid paths, respectively, such that the operating fluid is selectively diverted through one of the fluid paths and the associated filter, while the remaining fluid path and filter remain free of operating fluid. The latter filter can then be removed and replaced without interrupting operation of the user device because of the constant flow of operating fluid through the first fluid path and filter to the user device.

In a specific embodiment the dual filter isolation block of this invention is designed to isolate hydraulic oil or fluid flowing between an actuator and a servo valve, which actuator operates steam valves on a turbine and the servo valve serves to control operation of the actuator. A pair of distinct fluid paths are provided in the main body of the isolation block to selectively receive operating hydraulic oil or fluid flowing under pressure from a storage tank through the actuator and the isolation block, into the servo valve. Each of these fluid paths includes a removable filter and a pair of spool valves operate in sliding concert in the isolation block and intersect the respective fluid paths, such that the hydraulic operating oil or fluid can be directed from a tank through the actuator and through a selected one of the fluid paths and filters into the servo valve and back from the servo valve through the isolation block and the actuator to the tank, while the other filter is removed and replaced. This operation eliminates the necessity for discontinuing or disrupting operation of the servo valve while typically removing a conventional filter which serves the conventional single fluid path between the actuator and the servo valve.

2. Description of the Prior Art

Various mechanisms are known in the art for diverting fluid flow from one point to another in various types of devices. U.S. Pat. No. 3,521,673, dated Jul. 28, 1970, to Gruner, et al, details a constant flow fluid diverting valve which has six fluid ports and is used in four pipe temperature conditioning systems, with a cylindrical plunger longitudinally movable in a valve body to selectively connect to the appropriate ports. U.S. Pat. No. 4,271,020, dated Jun. 2, 1981, to Van Meter, details a valve for a filter device, wherein the valve assembly includes a rotatable valve spindle removable with respect to a valve housing and having first and second channels communicating with the filter. A bypass channel is also provided to bypass the fluid filter. Fluid may flow through the respective channels, including the bypass channel, responsive to rotation of the spindle into a selected position. U.S. Pat. No. 4,469,131, dated Sep. 4, 1984, to Paul L. Traylor, details a spool valve including a valve stem mounting a pair of valve heads removable in a body and cooperating with various valve seats to direct fluid along respective paths through the fluid body. U.S. Pat. No. 4,501,295, dated Feb. 26, 1985, to Williams, details a transfer valve having a valve casing with a closed bottom, a closed top and a separator plate dividing the interior of the valve casing into an upper chamber and a lower chamber. Inlet and outlet ports communicate with the upper and lower chambers and two additional ports open into both the upper chamber and the lower chamber. Valves are provided in the upper and lower chamber and a control rod extends through the device to simultaneously rotate the valve and channel fluid through the respective ports. U.S. Pat. No. 4,683,914, dated Aug. 4, 1987, to Brisland, details a slide valve having a valve body with a slide mounted therein for controlling opening interconnection and closing of various valve ports in the body. U.S. Pat. No. 5,152,320, dated Oct. 6, 1992, to Zimmerly, details a diverter valve which includes a valve body with two identical sections having valve seats and a valve stem extending through the valve body. A valve actuator lifts the valve stem, closing a pair of plugs in the valves and selectively allowing fluid to flow from various ports communicating with the valve body. U.S. Pat. No. 5,184,643, dated Feb. 9, 1993, to Raymond, details a valve sleeve assembly, typically having a valve sleeve defining a generally truncated, triangular, upraised land formed by complimentary shaped, adjacent recesses, when the sleeve is used as shown in a section taken along a radial plane perpendicular to the axis of the spool bore.

It is an object of this invention to provide a new and improved dual filter isolation block or selectively filtering an operating fluid from a source to a user apparatus or device and facilitating removal and replacement of one of the filters in the isolation block without discontinuing or interrupting operation of the user device.

Another object of the invention is to provide a dual filter isolation block for sandwiching between a source of operating fluid and a user or control device receiving that fluid, which isolation block includes a pair of distinct fluid paths extending through the isolation block and serving a pair of filters, respectively, with a pair of spools operating in sliding concert in the isolation block and extending through the fluid paths, respectively, such that the operating fluid can be selectively diverted through one of the fluid paths and its corresponding filter into the user or control device, thus leaving the second fluid path and filter free of operating fluid to facilitate changing the second filter without the necessity of interrupting the flow of operating fluid from the source to the user or control device.

Still another object of the invention is to provide a dual filter isolation block and method of use for protecting a user device or mechanism from contaminants in operating oil or fluid flowing from a source, which dual filter isolation block is inserted between the source and the user device. The dual filter isolation block is characterized by a pair of fluid paths, each fitted with a filter and a pair of slidably disposed spools intersecting the respective fluid paths to facilitate selective isolation of one of the fluid paths and the filter from the other fluid path and filter by slidable operation of the spools in the isolation block.

Yet another object of this invention is to provide dual filter isolation block and method for isolating an operating oil or fluid such as hydraulic fluid between an actuator and a control device such as a servo valve in order to protect the servo valve from contaminants in the hydraulic fluid. The isolation block includes a main body; a pair of separate fluid paths provided in the main body extending from the actuator to the servo valve and a pair of filters provided in the fluid paths, respectively; and a pair of spools having areas of reduced diameter for fluid flow, the spools slidably disposed in the main body of the isolation block and intersecting the respective fluid paths, such that the flow of hydraulic fluid from the actuator into the servo valve is isolated in and directed through a selected one of the fluid paths, the areas of reduced diameter in the spools and the associated filter and the opposite filter can be replaced without interrupting the flow of hydraulic fluid between the actuator and the servo valve.

still further object of the invention is to provide a method for protecting an end user mechanism or device such as a servo valve from contaminants in an operating fluid flowing from a source to the end user device, which method includes providing a dual filter isolation block between the operating fluid source and the end user device; providing a pair of fluid paths in the isolation block, both of which fluid paths include a removable filter; providing a pair of slidably-operated spools having areas of reduced diameter in the isolation block for intersecting the fluid paths, respectively; and operating the spools in concert to direct a flow of operating fluid from the fluid source through one of the fluid paths and its associated filter and spool in the isolation block, to the user device, thus facilitating removal and replacement of the second filter without interrupting the flow of operating fluid from the source to the user device.

SUMMARY OF THE INVENTION

These and other objects of the invention are provided in a new and improved new filter isolation block and method for isolating an operating fluid such as hydraulic fluid between a control device such as an actuator and an end user control mechanism or device such as a servo valve, as in a turbine electricity generating system, which isolation block includes a pair of fluid paths and a pair of filters provided in the fluid paths, respectively, along with a pair of spool valves having fluid flow cavities, slidably seated in the isolation block and intersecting the fluid paths, respectively, wherein operating hydraulic fluid is allowed to flow through the actuator and through a selected one of the fluid paths and the spool cavities in the filter isolation block, into the servo valve for operating the servo valve responsive to first and second selected positions of the spool valve, and the opposite filter is isolated from the flow of the operating fluid and may be removed from the opposite or second fluid path without interrupting the flow of operating fluid to and from the servo valve.

BRIEF DESCRIPTION OF THE DRAWINGS

The invention will be better understood by reference to the accompanying drawings, wherein.

DESCRIPTION OF THE PREFERRED EMBODIMENTS

Figure 1:
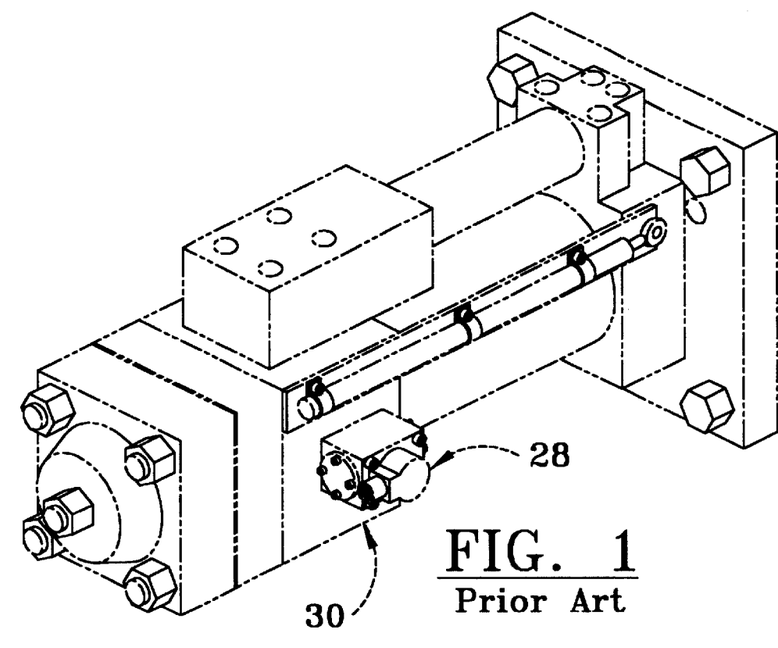
FIG. 1 is a perspective view of a conventional actuator and servo valve combination for operating the steam valves (not illustrated) of a turbine (not illustrated)
Figure 13:
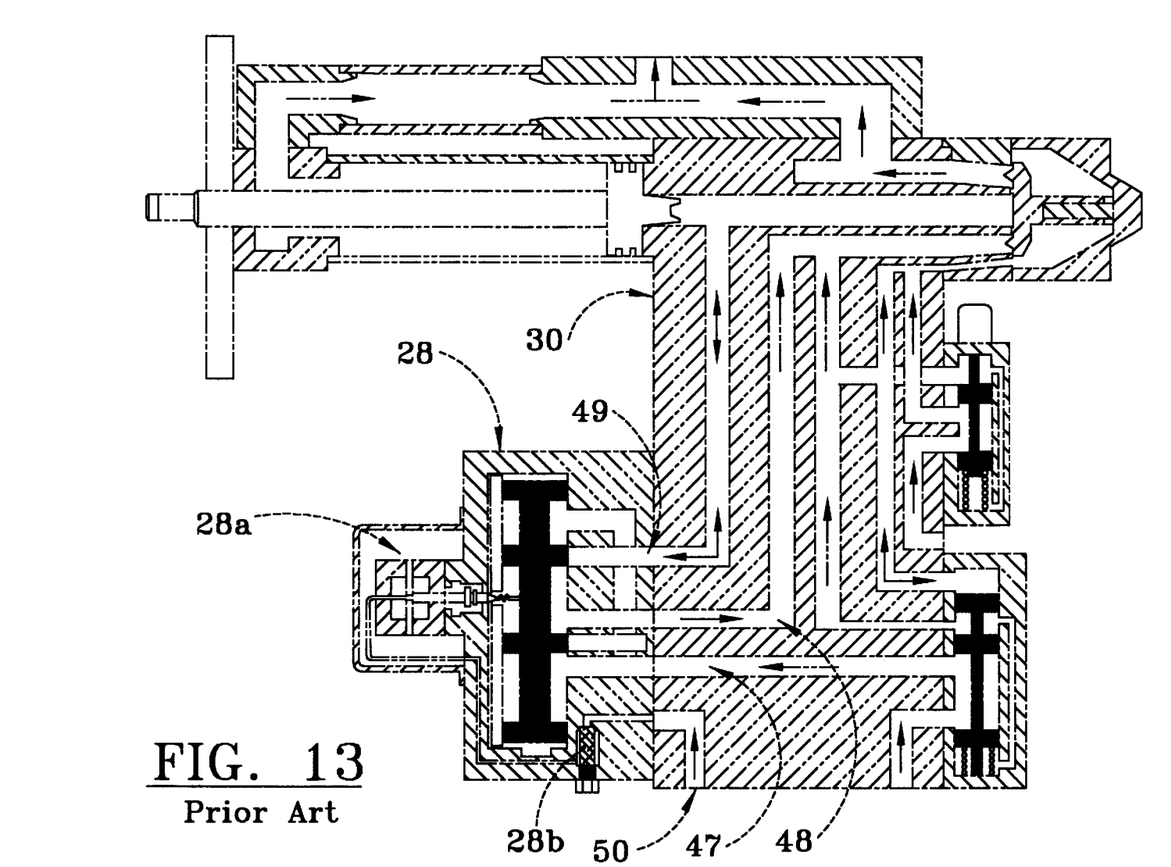
FIG. 13 is a sectional view and flow diagram of the conventional actuator and servo valve combination illustrated in FIG. 1, more particularly illustrating a typical hydraulic oil or fluid flow from the actuator to the servo valve and from the servo valve back to the actuator, in a typical actuator-servo valve system.

FIGS. 1 and 13 of the drawings illustrate a conventional turbine operating system wherein steam valves (not illustrated) are used to control the speed of a turbine (not illustrated) and an actuator-servo valve combination is used to control the steam valves. A servo valve 28 is connected to an actuator 30 in functional configuration. The actuator 30 controls the steam valve (not illustrated), which in turn controls the speed of a turbine (not illustrated) in an electricity-generating system, according to the knowledge of those skilled in the art. The servo valve 28 is typically attached directly to the actuator 30 such that an inlet fluid flow 47 flows from the actuator 30 into the servo valve 28 and returns by means of a return fluid flow 48, as illustrated in FIG. 13. A control fluid flow 49 serves to control operation of the actuator 30 responsive to a pilot fluid flow 50 through the actuator 30 and into the servo valve pilot mechanism 28a of the servo valve 28, further according to the knowledge of those skilled in the art. A servo valve filter 28b is typically provided in the pilot fluid flow 50 for filtering the pilot fluid prior to entry into the servo valve pilot mechanism 28a.

Figure 2:
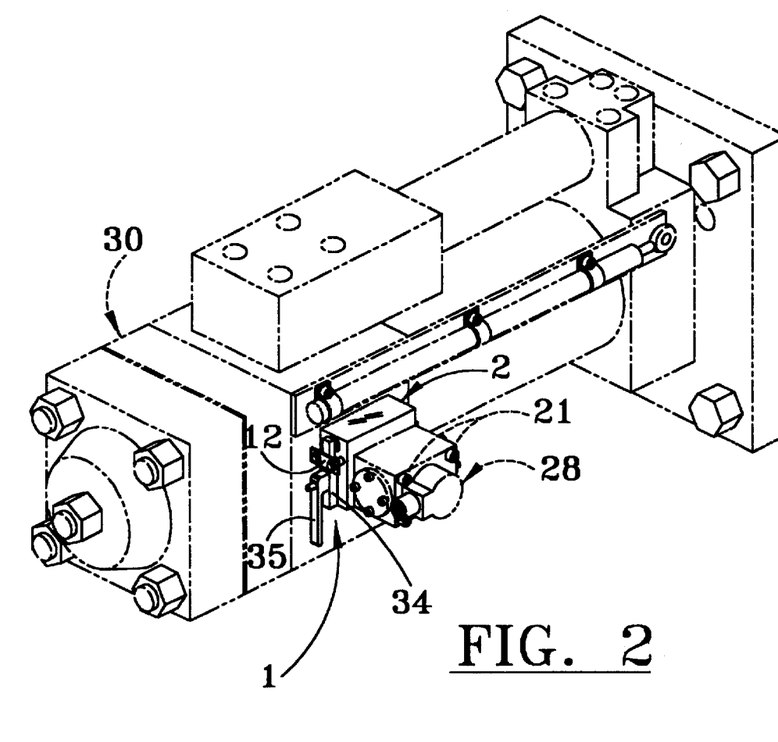
FIG. 2 is a perspective view of the actuator and servo valve illustrated in FIG. 1, with the dual filter isolation block of this invention inserted therebetween.
Figure 14:
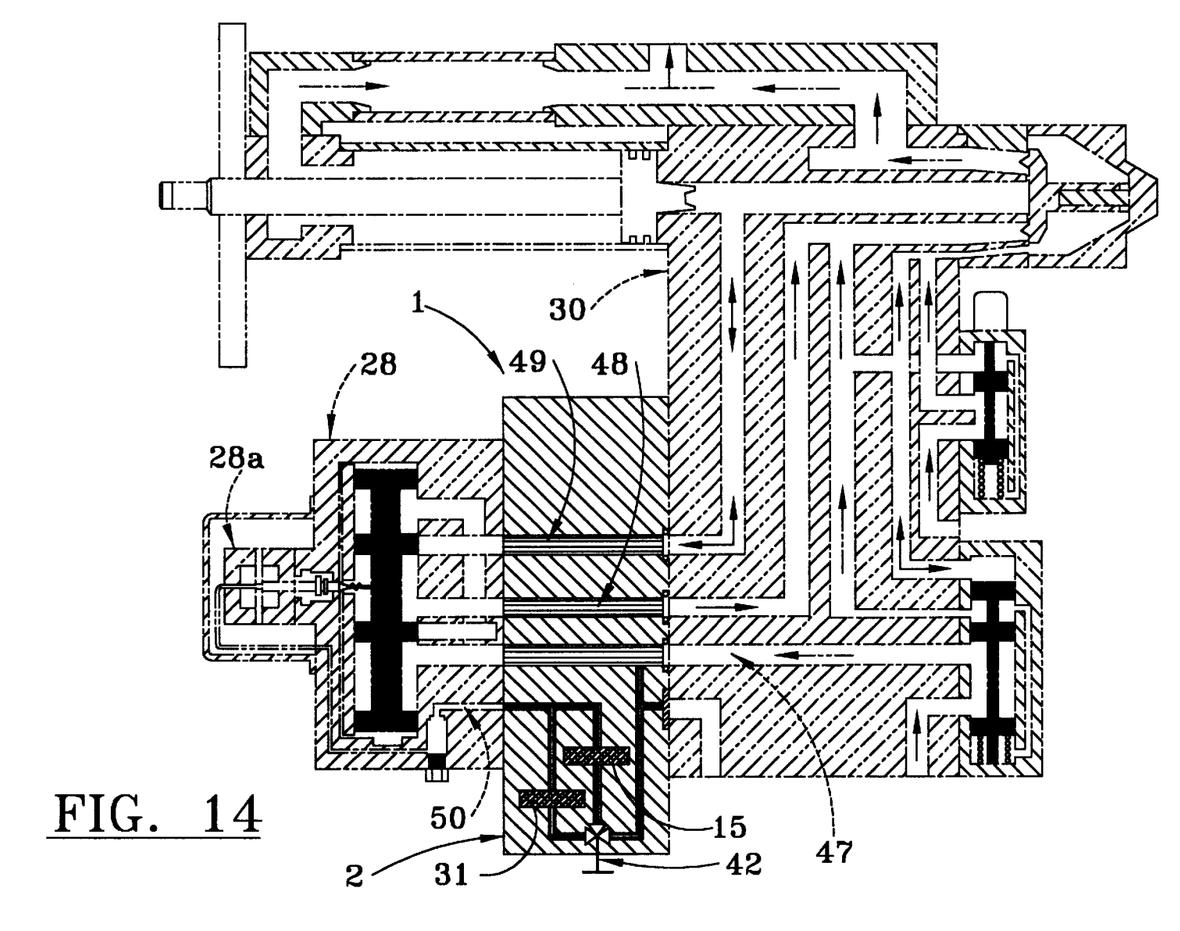
FIG. 14 is a sectional view of the actuator, dual filter isolation block and servo valve, with a flow diagram, more particularly illustrating the dual filter isolation block inserted between the actuator and servo valve.

Referring now to FIGS. 2 and 14 of the drawings, a dual filter isolation block 1 is inserted between the servo valve 28 and the actuator 30 and includes a valve 42, illustrated in schematic form in FIG. 14, which represents in schematic a pair of spool valves 5 and 6 (FIG. 3) which control the flow of control fluid through the main body 2 of the dual filter isolation block 1 and selectively, through a top filter 15 and a bottom filter 31, as hereinafter more particularly described. As in the case of the conventional servo valve 28-actuator 30 combination illustrated in FIG. 13, a control fluid flow 49 is provided from the actuator 30 through the main body 2 of the dual filter isolation block 1 and into the servo valve 28. Similarly, an inlet fluid flow 47 extends from a storage tank or vessel (not illustrated) through the actuator 30 and the main body 2 of the dual filter isolation block 1 and into the servo valve 28, while a return fluid flow 48 extends from the servo valve 28 through the main body 2 of the dual filter isolation block, into the actuator 30 and back to the storage tank or vessel.

Figure 5:
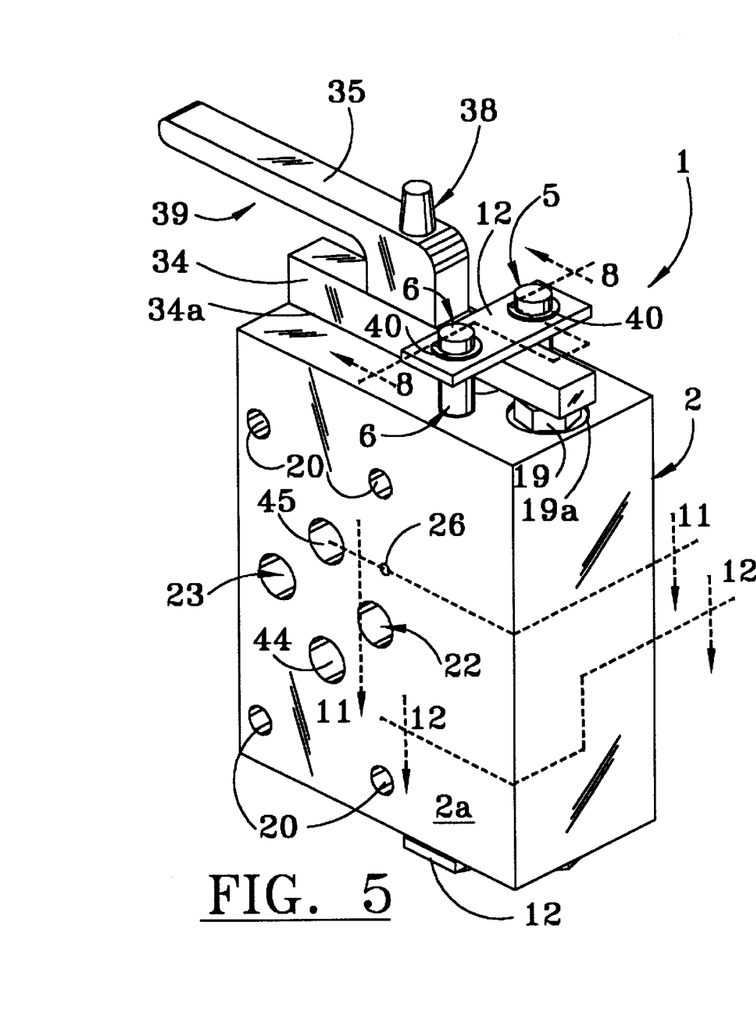
FIG. 5 is a perspective view, including the servo valve face of the dual filter isolation block illustrated in FIGS. 2–4, more particularly illustrating a fluid inlet port, fluid return port and a pair of operating or shifting ports provided therein.
Figure 6:
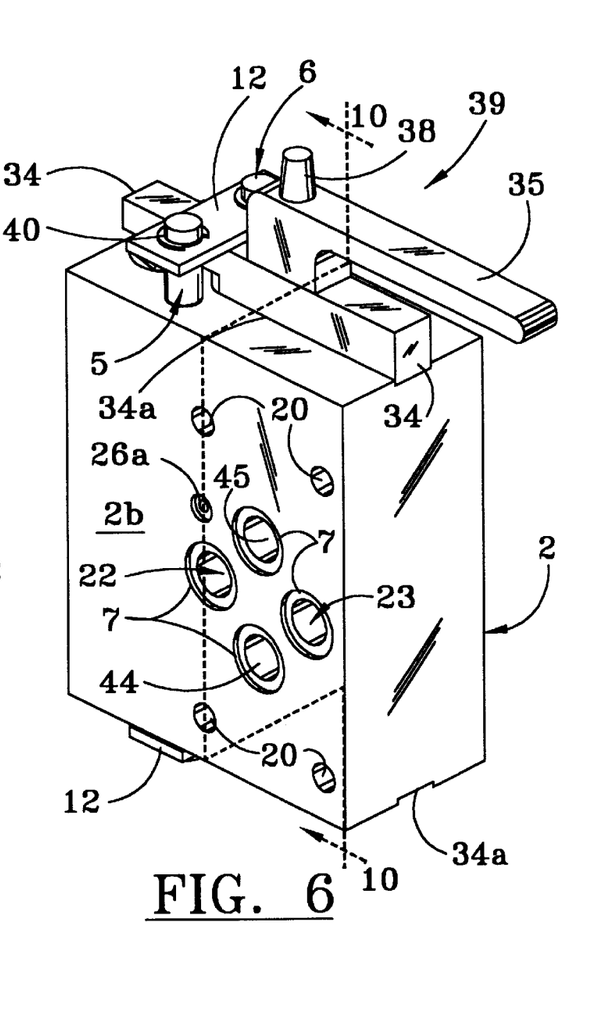
FIG. 6 is a perspective view of the opposite side of the dual filter isolation block illustrated in FIG. 5, more particularly illustrating the actuator face of the dual filter isolation block.

Referring to FIGS. 3–6 of the drawings, the dual filter isolation block 1 is characterized in a preferred embodiment by a generally rectangular main body 2, having a flat servo valve face 2a and actuator face 2b (FIG. 6) for receiving and mounting the servo valve 28 and the actuator 30, respectively. A bar slot 34a is provided on each end of the main body 2 and a bar slot opening 34b extends from the bottom of the bar slot 34a downwardly through the main body 2. A spool lock bar 34 element of a lock assembly 39 is designed to removably and selectively seat in the respective bar slots 34a and extend beneath a synchronizing bar or plate 12, attached to the ends of the inlet spool 5 and outlet spool 6 by means of clips 40, as illustrated in FIGS. 5 and 6. Accordingly, the lock assembly 39 serves to secure the spool lock bar 34 in place in the respective bar slots 34a for a purpose which is hereinafter described. A filter access plug 19 is threaded in a corresponding top filter cavity 14 and is sealed therein by means of a sealing washer 19a that fits in a sealing washer seat 19b, as further illustrated in FIG. 4. A top filter 15 is inserted in the top filter cavity 14, and the sealing washer 19a is fitted in the sealing washer seat 19b as the filter access plug 19 is threaded into the top segment of the top filter cavity 14. As further illustrated in FIGS. 5 and 6, a fluid inlet port 22 and a fluid return port 23, as well as a first shifting port 44 and a second shifting port 45 are typically provided in both the servo valve face 2a and the actuator face 2b of the main body 2. It will be appreciated by those skilled in the art that either three or four of these ports may be used in any typical installation, depending upon the design of the servo valve 28 and the actuator 30. For example, as illustrated in FIG. 14, three of the four ports, the fluid inlet port 22, the fluid return port 23 and either the first shifting port 44 or the second shifting port 45, are utilized to accommodate the inlet fluid flow 47, return fluid flow 48 and the control fluid flow 49 in the main body 2 and connecting with the servo valve 28 and the actuator 30, with the unused one of the shifting port 44 or the shifting port 45 closed or "blinded" against the servo valve 28 and the actuator 30. Mount bolt holes 20 extend through the main body 2 from the servo valve face 2a to the actuator lace 2b for receiving mount bolts (not illustrated) and mounting the dual filter isolation block 1 between the servo valve 28 and the actuator 30.

Figure 7:
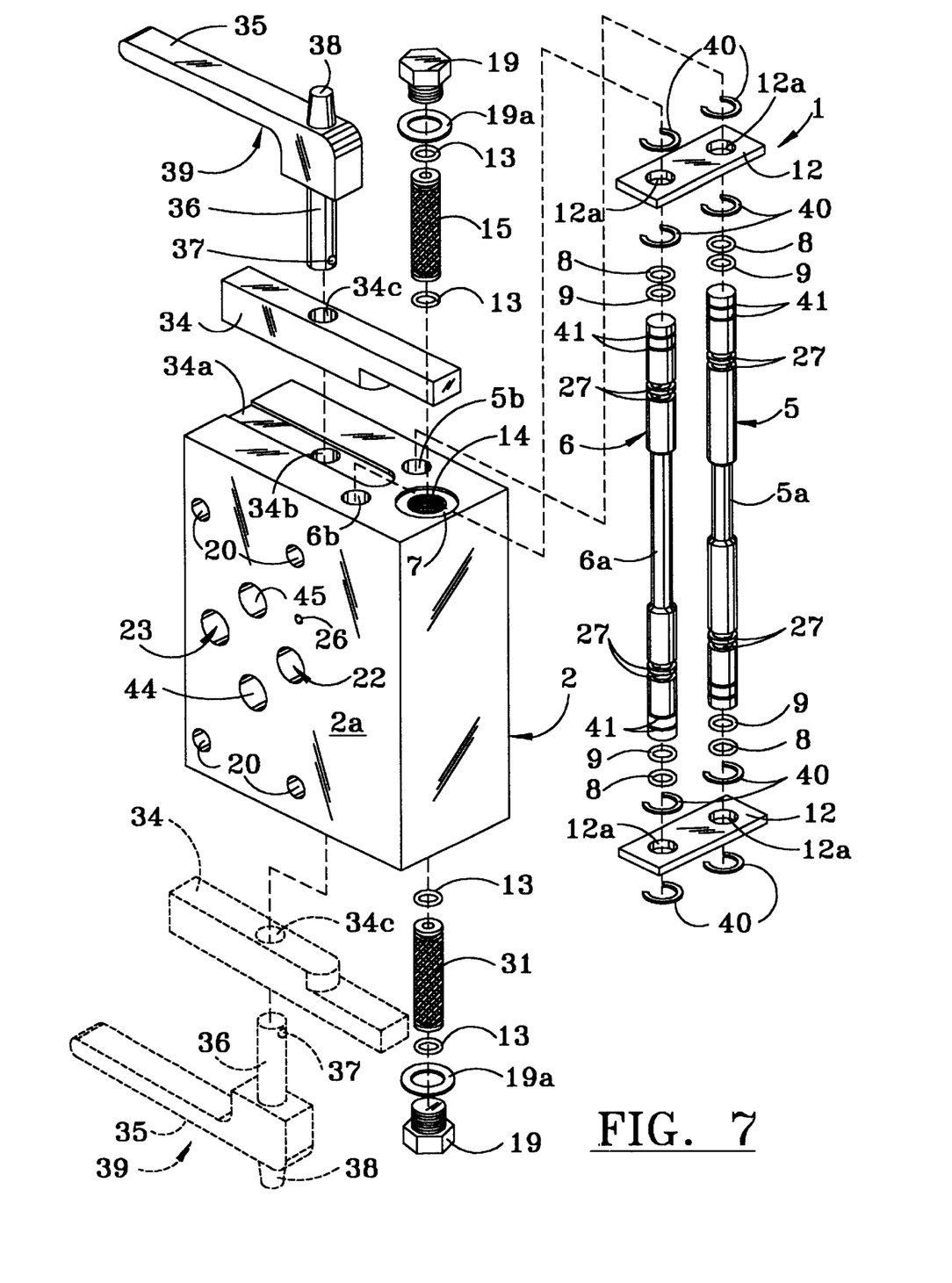
FIG. 7 is an exploded view of the dual filter isolation block illustrated in FIGS. 5 and 6, more particularly illustrating the internal main body components, including a pair of spool valves and filters that correspond to specific flow paths through the dual filter isolation block.

Referring now to FIG. 7 of the drawings the dual filter isolation block 1 is illustrated in exploded view and it will be appreciated that the spool lock bar 34 can be slidably inserted in the corresponding bar slot 34a on either the top or bottom of the main body 2, depending upon whether the top filter 15 or the bottom filter 31 is to be locked inside the main body 2. When the spool lock bar 34 is slidably inserted in the selected bar slot 34a, the corresponding filter access plug 19 is blocked and the grip lock pin 36 of a lock bar grip 35 in the lock assembly 39 is extended through a bar opening 34c provided in the spool lock bar 34, and further into the underlying and registering bar slot 34b in the bar slot 34a, to secure the spool lock bar 34 in the bar slot 34a over the filter access plug 19. In a preferred embodiment a spring-loaded ball 37 is provided in the bottom end of the grip lock pin 36 and is caused to extend from and recess into the grip lock pin 36 by depression and release, respectively, of the push button 38 fitted in the lock bar grip 35. Accordingly, the spring-loaded ball 37 can be caused to retract in the grip lock pin 36 upon application of pressure to the push button 38, and the grip lock pin 36 then extended through the bar opening 34c in the spool lock bar 34 and into the bar slot 34b, where it is locked in place by release of pressure from the push button 38 as the spring-loaded ball 37 extends into a slot or depression (not illustrated) provided in the main body 2 at the base of the bar slot 34b. Similarly, in the lock assembly 39 can be assembled on the bottom side of the main body 2 in a corresponding bar slot 34a (not illustrated) as illustrated in phantom in FIG. 7, under circumstances where it is desired to facilitate operation of the dual filter isolation block 1 with the inlet spool 5 and the outlet spool 6 locked in a selected alternative operational mode, as hereinafter further described.

Referring again to FIG. 7 of the drawings the inlet spool 5 and outlet spool 6 are each characterized by clip seats 41 at each end that receive clips 40 to facilitate mounting of the respective synchronizing bars 12 on each end of the inlet spool 5 and outlet spool 6, as illustrated. Additionally, corresponding sets of O-ring grooves 27 are provided in the inlet spool 5 and outlet spool 6 inwardly of the clip seats 41, for accommodating wiper O-rings 8 and sealer O-rings 9, respectively. Moreover, an inlet spool cavity 5a is provided near the center of the inlet spool 5 and a corresponding, somewhat longer, outlet spool cavity 6a is provided near the center of the corresponding outlet spool 6. The inlet spool 5 is slidably seated in a corresponding inlet spool cavity bore 5b, while the outlet spool 6 is similarly slidably mounted in a parallel outlet spool cavity bore 6b, each provided in the main body 2, as illustrated. It will be appreciated that the inlet spool 5 and outlet spool 6 are constrained to slide in concert in the respective inlet spool cavity bore 5b and outlet spool cavity bore 6b, by operation of the two synchronizing bars 12, each having bar openings 12a and seated on each end of the inlet spool 5 and outlet spool 6 by means of the clips 40. As further illustrated in FIG. 7, each of the top filter 15 and bottom filter 31 are seated and sealed in the corresponding top filter cavity 14 and bottom filter cavity 31a, respectively, by means of top and bottom filter seal O-rings 13, respectively.

Figures 8, 9:
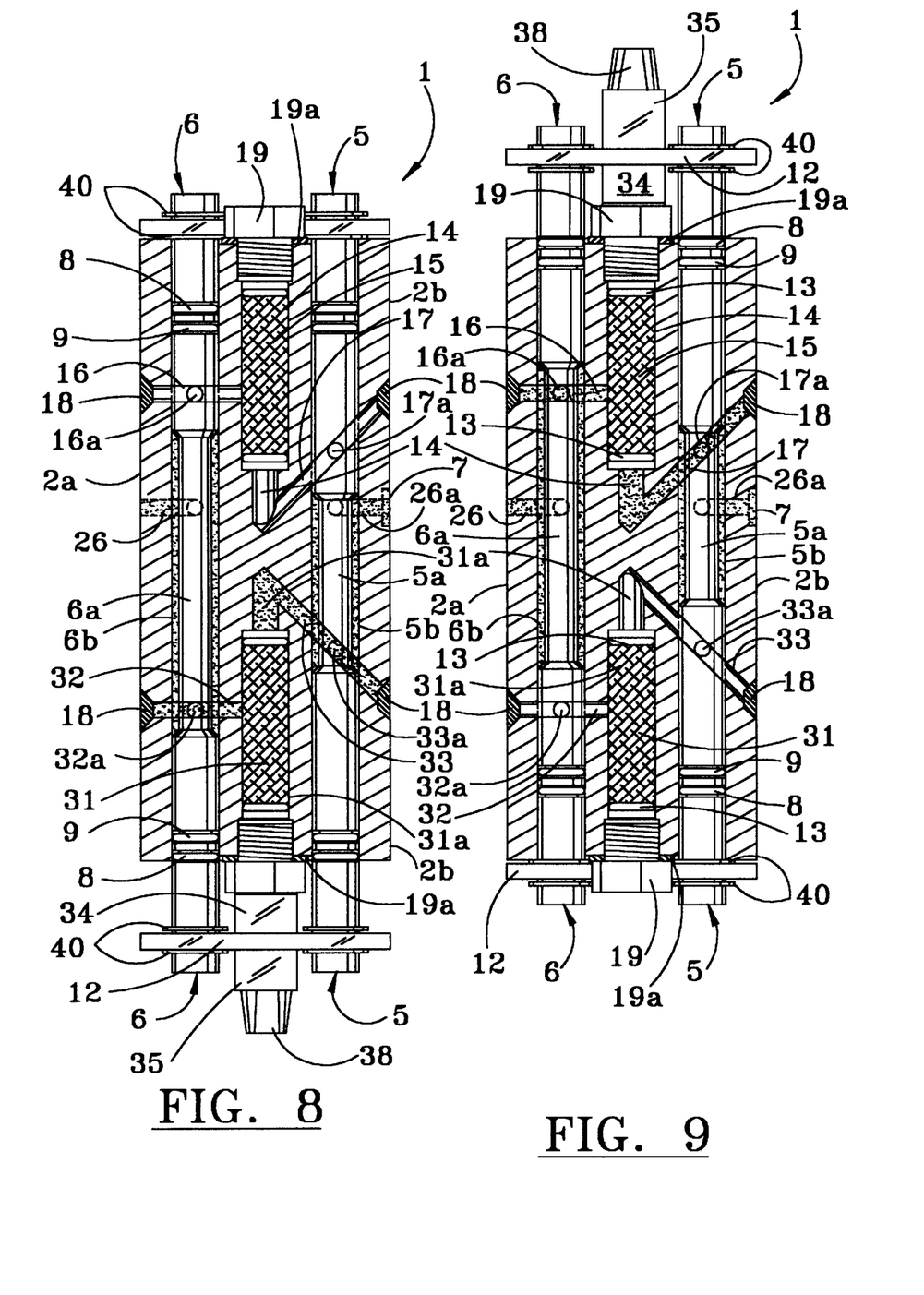
FIG. 8 is a sectional view taken along line 8—8 in FIG. 5, more particularly illustrating typical respective flow paths and corresponding filters and spool valves provided in the isolation block main body, wherein the bottom flow path is illustrated as filled with operating fluid responsive to downward shifting and locking of the spool valves in the main body.
FIG. 9 is a sectional view taken along line 8—8 of the dual filter isolation block illustrated in FIG. 5, more particularly illustrating the flow of operating fluid through the upper fluid path and filter responsive to shifting and locking of the spool valves in an upward operating configuration.

Referring now to FIGS. 8 and 9 of the drawings, the main body 2 is characterized by a pair of fluid paths, one of which accommodates the top filter 15 and the other, the bottom filter 31. As illustrated in FIG. 8, the top filter inlet port 16 is typically created by drilling a hole transversely through the main body 2 from the actuator face 2b and terminating at the top filter cavity 14. A weld 18 is provided in the main body 2 at the top filter inlet port 16 to seal the top filter inlet port 16 and a top filter inlet port leg 16a extends from the top filter inlet port 16 and terminates at the outlet spool 6. A top filter outlet port 17 is drilled from the servo valve face 2a of the main body 2 downwardly at an angle and connects to the bottom of the top filter cavity 14. Another weld 18 closes the entrance end of the top filter outlet port 17 and a top filter outlet port leg 17a extends from the top filter outlet port 17 to the inlet spool 5.

Similarly, as further illustrated in FIG. 9, a bottom inlet port 32 extends from the actuator face 2b of the main body 2 to the bottom filter cavity 31a, which houses the bottom filter 31. Another weld 18 closes the entrance end of the bottom filter inlet port 32. A bottom filter inlet port leg 33a joins the bottom filter inlet port 32 to the outlet spool cavity 6a of the outlet spool 6. A bottom filter outlet port 33 extends from the top end of the bottom filter cavity 31a to the servo valve face 2a face of the main body 2 and is typically drilled from that face in upwardly angular relationship into the bottom filter cavity 31a, as illustrated. A weld 18 closes the entrance drill bore of the bottom filter outlet port 33 and a bottom filter outlet port leg 33a extends from the bottom filter outlet port 33 to the inlet spool cavity 5a of the inlet spool 5.

Referring again to FIG. 8 of the drawings, an O-ring seat 7 is typically provided in the outlet pilot pressure port 26a, provided in the actuator face 2b of the main body 2, to seal this port against a corresponding fluid flow aperture in the actuator 30. The inlet pilot pressure port 26 extends to the outlet spool cavity 6a of the outlet spool 6, while the outlet pilot pressure port 26a extends to the inlet spool cavity 5a of the inlet spool 5, as illustrated. Accordingly, when the dual filter isolation block 1 is in the configuration illustrated in FIG. 8, an operating fluid such as hydraulic oil or fluid introduced under pressure from the actuator 30 into the inlet pilot pressure port 26 at the actuator face 26, flows downwardly through the annulus created by the outlet spool cavity 6a and the outlet spool bore 6b, to the bottom filter inlet port leg 32a and from there into the bottom filter inlet port 32 and through the bottom filter 31 and the top of the bottom filter cavity 31a, to the bottom filter outlet port 33. The hydraulic fluid then flows from the bottom filter outlet port 33 through the bottom filter outlet port leg 33a, to the annulus created between the inlet spool cavity 5a and the inlet spool bore 5b and from there upwardly, to the pilot pressure port 26a at the servo valve face 2a and into the servo valve 28.

It will be understood that while the working oil or fluid is constrained to flow through the bottom filter 31 as indicated above in the flow configuration illustrated in FIG. 8, it is not permitted to flow simultaneously through the top filter 15, since the top filter inlet port leg 16a is closed against the outlet spool 6 at the outlet spool bore 6b above the outlet spool cavity 6a, to prevent hydraulic fluid from flowing past that point. Accordingly, since hydraulic working oil or fluid is not introduced into the top filter inlet port 16, the top filter 15 is isolated from the operating hydraulic fluid and can be removed and replaced by simply unthreading the top filter access plug 19 and removing and replacing the top filter 15. It is further significant that this operation in no way hinders the flow of operating hydraulic fluid through the bottom filter 31 and to the servo valve 28, as above described. The inlet spool 5 and outlet spool 6 are locked into the filter 31 flow configuration illustrated in FIG. 8 and access to the bottom access plug 19 is blocked by means of the spool lock bar 34 and the lock bar grip 35 elements of the lock assembly 39.

Referring now to FIG. 9 of the drawings, under circumstances where it is desired to isolate the bottom filter 31 and facilitate a flow of operating hydraulic fluid through the top filter 15, the lock assembly 39 is removed from the bottom end of the inlet spool 5 by depressing the push button 38 on the lock bar grip 35 and the inlet spool 5 and outlet spool 6 are shifted upwardly in concert to the position illustrated in FIG. 9, thereby also shifting the relative positions of the inlet spool cavity 5a and outlet spool cavity 6a internally in the main body 2. The lock assembly 39 is then replaced on the top end of the inlet spool 5 and outlet 5 spool 6, to block access to the top filter access plug 19, as illustrated. Consequently, operating hydraulic fluid introduced into the inlet pilot pressure port 26 extends to the annulus created between the outlet spool cavity 6a and the corresponding outlet spool bore 6b and the hydraulic fluid is caused to flow through that annulus into the top filter inlet port leg 16a and from there into the top filter inlet port 16, through the top filter 15 and from the bottom end of the top filter cavity 14, through the top filter outlet port 17 and the top filter outlet port leg 17a, to the annulus created by the inlet spool cavity 5a and the inlet spool bore 5b. From that annulus, the operating hydraulic fluid flows through the servo valve 28 from the outlet pilot pressure port 26a. While the hydraulic operating fluid is flowing through the top filter 15 as described above, it will be appreciated that it is unable to flow through the isolated bottom filter 31, since the bottom filter inlet port leg 32a is blinded against the inlet spool 5 at the inlet spool bore 5b and is not in alignment with the outlet spool cavity 6a. Furthermore, the bottom filter outlet port leg 33a is similarly blinded or closed against the inlet spool 5. Accordingly, the hydraulic fluid cannot flow through the bottom filter 31 and the bottom filter 31 may be quickly and easily removed from the bottom filter cavity 31a by removing the bottom filter access plug 19 as described above with respect to the top filter 15, without interrupting the flow of hydraulic fluid from the actuator 30 to the servo valve 28 through the top filter 15.

Figures 3, 4:
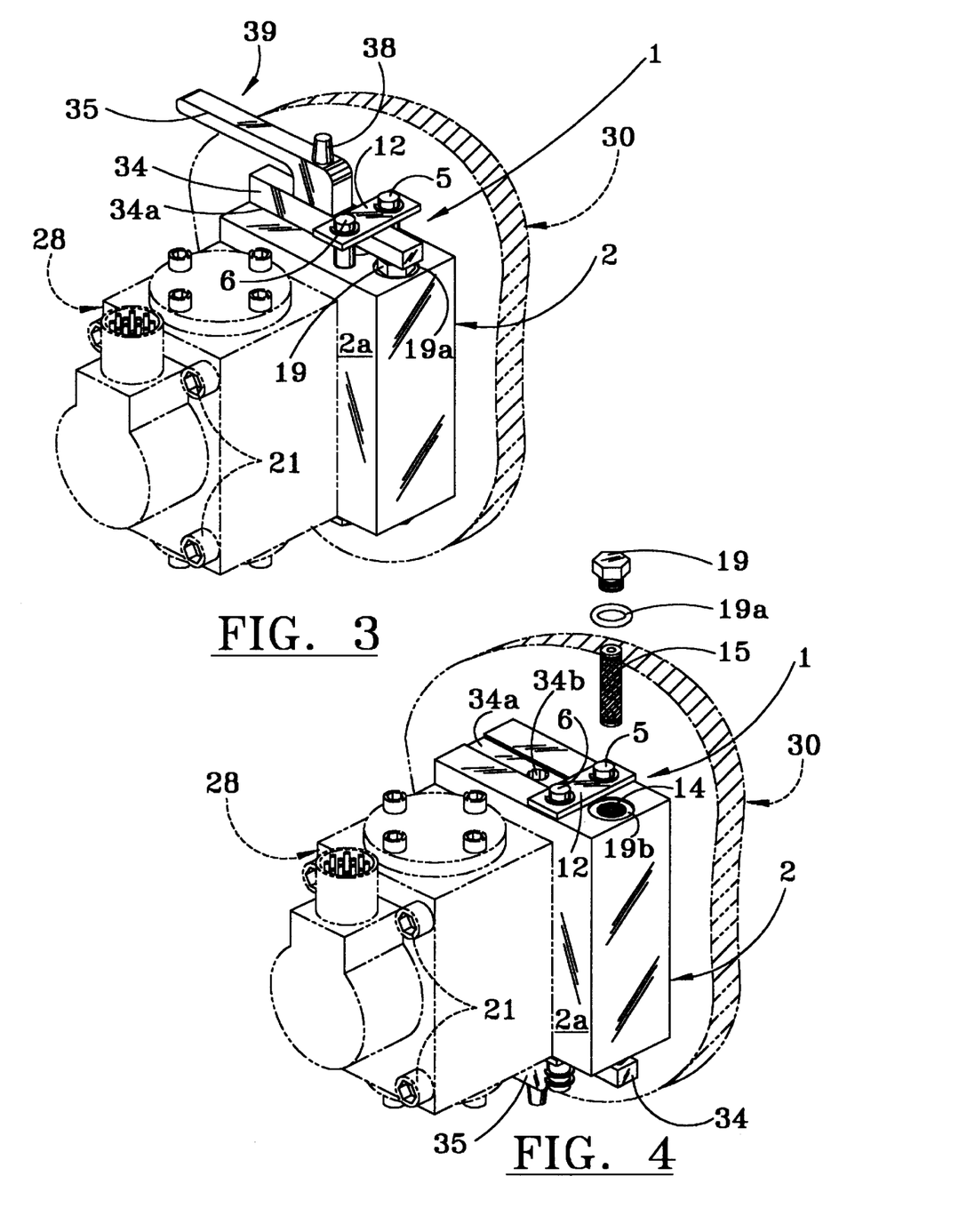
FIG. 3 is an enlarged view of the servo valve illustrated in FIGS. 1 and 2 and a portion of the actuator, illustrated in phantom, with the dual filter isolation block inserted therebetween.
FIG. 4 is a perspective view of the actuator, servo valve and dual filter isolation block illustrated in FIG. 3, more particularly illustrating removal of a filter from the isolated one of the fluid paths provided in the dual filter isolation block.
Figures 10, 11, 12:
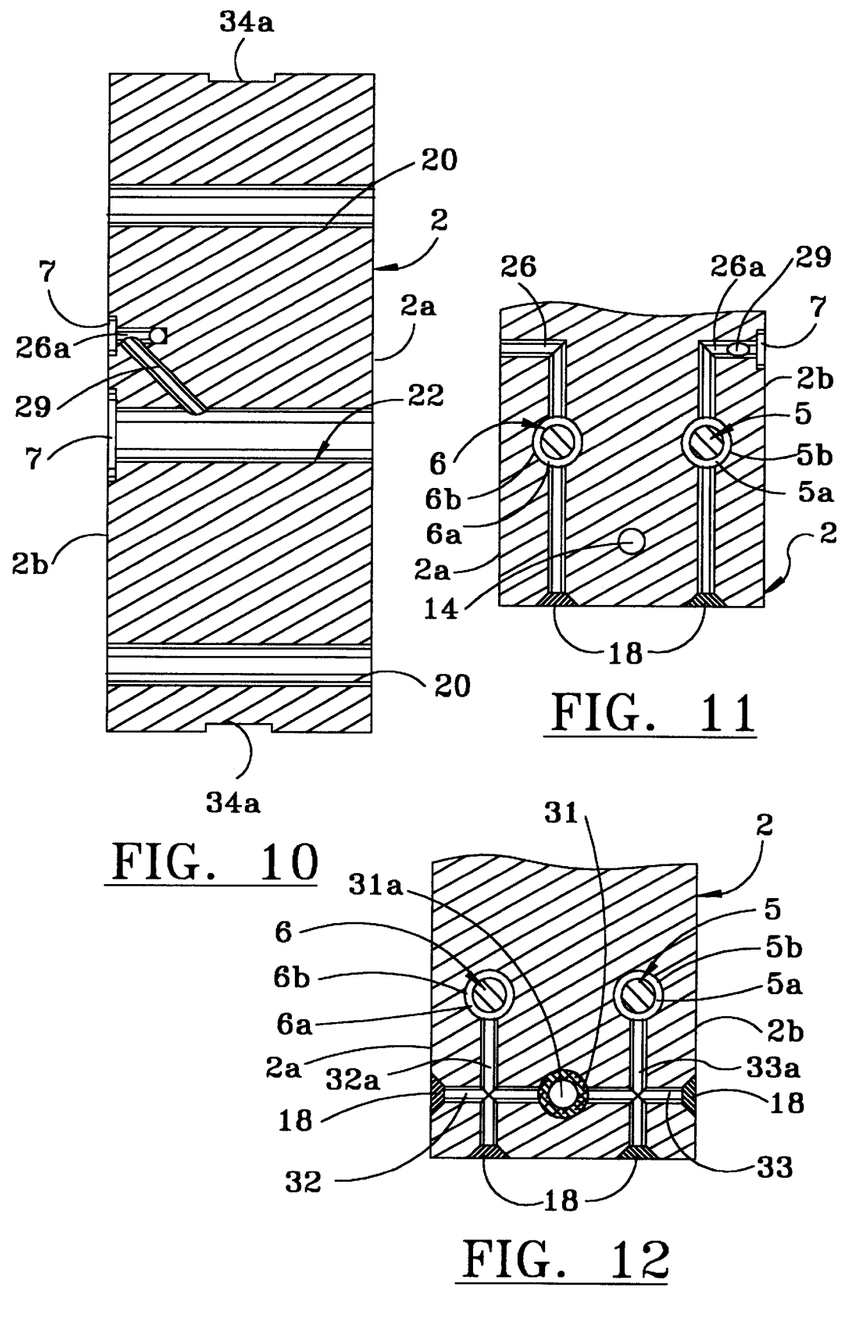
FIG. 10 is a sectional view taken along line 10—10 of the dual filter isolation block illustrated in FIG. 6, more particularly illustrating a typical inlet pressure port communicating with a fluid inlet port in the main body of the dual filter isolation block.
FIG. 11 is a sectional view taken along line 11—11 in FIG. 5, more particularly illustrating fluid flow paths intersecting the spool valves in the main body.
FIG. 12 is a sectional view taken along line 12—12 of the dual filter isolation block illustrated in FIG. 5, more particularly illustrating additional flow paths intersecting the spool valves therein.

Referring now to FIGS. 8, 9 and 10 of the drawings, hydraulic oil or fluid is caused to enter the inlet pilot pressure port 26 under pump pressure from a tank (not illustrated) and from the actuator 30, typically by means of a pilot service line 29 (FIG. 10) which extends from the fluid inlet port 22 to the inlet pilot pressure port 26. Furthermore, FIG. 10 also illustrates the bar slot 34a in both the top and bottom ends of the main body 2 for accommodating the spool lock bar 34 element of the lock assembly 39, as heretofore described, and the mount bolt holes 20 are also illustrated for mounting the main body 2 to the servo valve 28 and the actuator 30 using suitable mount bolts 21, as illustrated in FIGS. 2–4.

Referring now to FIGS. 8, 9 and 11 of the drawings, the inlet spool 5 and outlet spool 6 are shown in section, more particularly illustrating the inlet spool cavity 5a and corresponding outlet spool cavity 6a, as well as the inlet pilot pressure port 26 and the outlet pilot pressure port 26a. The welds 18 serve to blind off the top filter outlet port 17 and the outlet pilot pressure port 26a, as further heretofore described.

Referring to FIGS. 8, 9 and 12 of the drawings, in similar fashion the inlet spool 5 and outlet spool 6 with accompanying inlet spool cavity 5a and outlet spool cavity 6a are illustrated, with the connecting bottom filter inlet port 32 and the bottom filter inlet port leg 32a, as well as the bottom filter outlet port 33 and the bottom filter outlet port leg 33a, one end of each of which bottom filter inlet port 32 and bottom filter outlet port 33 is terminated by welds 18 to facilitate a flow of hydraulic fluid through the respective ports as described above.

In operation, and referring again to the drawings, under circumstances where it is desired to facilitate a flow of operating hydraulic oil or fluid from the actuator 30 to the servo valve 28 and back to the actuator 30 through the main body 2 of the dual filter isolation block 1, with the flow path extending through the bottom filter 31, the inlet spool 5 and outlet spool 6 are initially shifted downwardly in the main body 2, as illustrated in FIG. 8. Secure positioning of the inlet spool 5 and outlet spool 6 in the configuration illustrated in FIG. 8 and blocking of the bottom filter access plug 19 is assured by sliding the spool lock bar 34 into the corresponding bar slot 34a in the bottom side of the main body 2, depressing the push button 38 and projecting the grip lock pin 36 through the corresponding bar opening 34c in the spool lock bar 34 and into the bar slot 34b provided in the bottom of the bar slot 34a. The push button 38 is then released to facilitate extension of the spring-loaded ball 37 outwardly into a slot (not illustrated) provided in the main body 2 to lock the spool lock bar 34 securely in the bar slot 34a beneath the lower synchronizing bar 12. This action prevents shifting of the inlet spool 5 and outlet spool 6 from the position illustrated in FIG. 8 to the position illustrated in FIG. 9. Accordingly, hydraulic oil or fluid introduced from the actuator 30 into the fluid inlet port 22 illustrated in FIGS. 7 and 10, also flows under pressure through the pilot service line 29 into the inlet pilot pressure port 26 and through the bottom filter 31 as heretofore described, where it exits the outlet pilot pressure port 26a and flows into the servo valve 28. In this flow configuration, as heretofore described, access to the bottom filter 31 is blocked and the hydraulic oil or fluid cannot flow through the top filter 15 and the top filter 15 may therefore be removed and replaced, as further heretofore described.

Under circumstances where it is desired to facilitate a flow of hydraulic oil or fluid through the newly installed top filter 15 and change the bottom filter 31, the push button 38 on the lock bar grip 35 is depressed and the lock bar grip 35 removed from contact with the spool lock bar 34 to facilitate sliding the spool lock bar 34 from beneath the bottom synchronizing bar 12 and from the bottom bar slot 34a. This action facilitates shifting of the inlet spool 5 and the outlet spool 6 in concert to the position illustrated in FIG. 9, where the spool lock bar 34 is again slipped into position in the top bar slot 34a beneath the top synchronizing bar 12 and the spool lock bar 34 again locked into position to block access to the top filter 15 by operation of the push button 38 and spring-loaded ball 37, as heretofore described. The inlet spool 5 and outlet spool 6 cannot therefore be inadvertently shifted back into the position illustrated in FIG. 8 due to the presence of the spool lock bar 34. Under these circumstances, hydraulic oil or fluid introduced into the fluid inlet port 22 is also introduced under pressure into the inlet pilot pressure port 26 as heretofore described and flows through the top filter 15 and from the outlet pilot pressure port 26a, into the servo valve 28. The isolated bottom filter 31 can then he removed and exchanged as desired and as heretofore described.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A servo valve and dual filter isolation block for fluid connection to an actuator and isolating and filtering hydraulic fluid, comprising a servo valve; a main body; a first fluid path provided in said main body between the actuator and said servo valve and a first filter provided in said first fluid path; a second fluid path provided in said main body between the actuator and said servo valve and a second filter provided in said second fluid path; and a pair of spools slidably disposed in said main body and intersecting said first fluid path and said second fluid path respectively, for selectively isolating said first fluid path and said first filter from said second fluid path and said second filter and selectively filtering the hydraulic fluid, responsive to slidable manipulation of said spools into fixed positions in said main body.

2. The dual filter isolation block of claim 1 comprising a single inlet and a single outlet provided in said main body for accommodating the hydraulic fluid and defining said first fluid path and said second fluid path.

3. The dual filter isolation block of claim 1 comprising access ports provided in said main body, said access ports communicating with said first filter and said second filter, respectively, for selectively changing said first filter and said second filter in said block.

4. The dual filter isolation block of claim 1 comprising:
   (a) a single inlet and a single outlet provided in said main body for accommodating the hydraulic fluid and defining said first fluid path and said second fluid path; and
   (b) access ports provided in said main body, said access ports communicating with said first filter and said second filter, respectively, for selectively changing said first filter and said second filter in said block.

5. The dual filter isolation block of claim 1 comprising segments of reduced diameter provided in said spools for intersecting said first fluid path and said second fluid path and selectively regulating the flow of hydraulic fluid through said first filter and said second filter.

6. The dual filter isolation block of claim 5 comprising a single inlet and a single outlet provided in said main body for accommodating the hydraulic fluid and defining said first fluid path and said second fluid path.

7. The dual filter isolation block of claim 5 comprising access ports provided in said main body, said access ports communicating with said first filter and said second filter, respectively, for selectively changing said first filter and said second filter in said block.

8. The dual filter isolation block of claim 5 comprising:
   (a) a single inlet and a single outlet provided in said main body for accommodating the hydraulic fluid and defining said first fluid path and said second fluid path; and
   (b) access ports provided in said main body, said access ports communicating with said first filter and said second filter, respectively, for selectively changing said first filter and said second filter in said block.

9. A dual filter isolation block for hydraulic fluid, comprising a main body; a first fluid path provided in said main body between the actuator and the servo valve and a first filter provided in said first fluid path; a second fluid path provided in said main body between said actuator and said servo valve and a second filter provided in said second fluid path; a pair of spools slidably disposed in said main body and intersecting said first fluid path and said second fluid path respectively, for selectively isolating said first fluid path and said first filter from said second fluid path and said second filter and selectively filtering the hydraulic fluid, responsive to slidable manipulation of said spools into fixed positions in said main body; and a pair of synchronizing bars connecting each end of said spools and a locking mechanism engaging said main body and said synchronizing bars for selectively locking said spools in said fixed positions in said main body.

10. The dual filter isolation block of claim 9 comprising a single inlet and a single outlet provided in said main body for accommodating the hydraulic fluid and defining said first fluid path and said second fluid path.

11. The dual filter isolation block of claim 9 comprising access ports provided in said main body, said access ports communicating with said first filter and said second filter, respectively, for selectively changing said first filter and said second filter in said block.

12. The dual filter isolation block of claim 9 comprising:
   (a) a single inlet and a single outlet provided in said main body for accommodating the hydraulic fluid and defining said first fluid path and said second fluid path; and
   (b) access ports provided in said main body, said access ports communicating with said first filter and said second filter, respectively, for selectively changing said first filter and said second filter in said block.

13. The dual filter isolation block of claim 12 comprising segments of reduced diameter provided in said spools for intersecting said first fluid path and said second fluid path and selectively regulating the flow of hydraulic fluid through said first filter and said second filter.

14. The dual filter isolation block of claim 9 comprising segments of reduced diameter provided in said spools for intersecting said first fluid path and said second fluid path and selectively regulating the flow of hydraulic fluid through said first filter and said second filter.

15. A dual filter isolation block for isolating hydraulic fluid between an actuator and a servo valve, comprising a main body; an inlet provided in said main body at the actuator and an outlet provided in said main body at the servo valve; a first fluid path provided in said main body, said said first fluid path communicating with said inlet and said outlet, and a first filter provided in said first fluid path; a second fluid path provided in said main body, said second fluid path communicating with said inlet and said outlet, and a second filter provided in said second fluid path; access ports provided in said main body, said access ports communicating with said first filter and said second filter, respectively, for selectively changing said first filter and said second filter in said block; a pair of spools slidably disposed for movement in concert in said main body and intersecting said first fluid path and said second fluid path, for selectively isolating and filtering hydraulic fluid in said first fluid path and said second fluid path responsive to slidable manipulation of said spools in concert to selected fixed positions in said main body, said spools each having a segment of reduced diameter for intersecting said first fluid path and said second fluid path and selectively regulating the flow of hydraulic fluid through said first filter and said second filter; and a pair of synchronizing bars connecting each end of said spools and a locking mechanism engaging said main body and said synchronizing bars for selectively locking said spools in said fixed positions in said main body.

16. A method of isolating the flow of hydraulic fluid from an actuator to a servo valve, comprising providing a fluid isolation block having an entrance port at the actuator and an exit port at the servo valve; providing a pair of fluid paths in said isolation block, said fluid paths each communicating with said entrance port and said exit port, respectively; providing a pair of filters in said fluid paths, respectively, for selectively filtering the hydraulic fluid; and providing a pair of spools slidably disposed in said isolation block and intersecting said fluid paths, respectively, for selectively causing the hydraulic fluid to flow through said fluid paths and said filters, respectively, responsive to slidably positioning said spools into selected fixed positions in said isolation block.

17. The method according to claim 16 comprising the step of providing segments of reduced diameter in said spools for intersecting said fluid paths, respectively, and selectively regulating the flow of hydraulic fluid through said filters, respectively.

* * * * *